(12) United States Patent
Collins et al.

(10) Patent No.: US 7,028,907 B2
(45) Date of Patent: Apr. 18, 2006

(54) METHOD AND DEVICE FOR DATA INPUT

(75) Inventors: Christopher Collins, Lincoln, RI (US);
Kurt Businger, Warwick, RI (US);
Scott Hultzman, Putnam, CT (US);
Kevin Romano, Barcelona (ES)

(73) Assignee: GTech Rhode Island Corporation, West Greenwich, RI (US)

( * ) Notice: Subject to any disclaimer, the term of this patent is extended or adjusted under 35 U.S.C. 154(b) by 0 days.

(21) Appl. No.: 10/452,994

(22) Filed: Jun. 2, 2003

(65) Prior Publication Data

US 2004/0050925 A1    Mar. 18, 2004

Related U.S. Application Data

(60) Provisional application No. 60/435,434, filed on Dec. 20, 2002, provisional application No. 60/386,506, filed on Jun. 5, 2002.

(51) Int. Cl.
*G06K 7/10* (2006.01)

(52) U.S. Cl. ............... 235/470; 235/435; 235/436; 235/462.01; 283/94; 463/17

(58) Field of Classification Search ............ 235/375, 235/470; 463/17; 283/94
See application file for complete search history.

(56) References Cited

U.S. PATENT DOCUMENTS

| | | | |
|---|---|---|---|
| 4,603,884 A * | 8/1986 | Burton | ............... 283/115 |
| 4,764,666 A | 8/1988 | Bergeron | |
| 4,882,473 A | 11/1989 | Bergeron et al. | |
| 5,239,165 A | 8/1993 | Novak | |
| 5,326,959 A | 7/1994 | Perazza | |
| 5,453,600 A | 9/1995 | Swartz | |
| 5,818,026 A | 10/1998 | Chew et al. | |
| 6,086,477 A * | 7/2000 | Walker et al. | ............... 463/17 |
| 6,273,817 B1 * | 8/2001 | Sultan | ............... 463/17 |
| 2001/0052083 A1 | 12/2001 | Willins et al. | |

FOREIGN PATENT DOCUMENTS

WO     PCT/IB03/02129     5/2003

OTHER PUBLICATIONS

U.S. Appl. No. 60/386,506, filed Jun. 5, 2002, Collins et al.
U.S. Appl. No. 60/435,434, filed Dec. 20, 2002, Collins et al.

* cited by examiner

*Primary Examiner*—Karl D. Frech
*Assistant Examiner*—Seung H Lee
(74) *Attorney, Agent, or Firm*—Kenyon & Kenyon LLP

(57) ABSTRACT

A method and system for data input is provided. The method includes inputting data, reading a subset of a set of predefined machine-readable codes from a printed media, the printed media including thereon the set of predefined machine-readable codes and a set of human-readable indicia. Each of the set of human-readable indicia is associated with a respective one of the set of predefined machine-readable codes. Each of the set of human-readable indicia indicates a user-selectable input value. The subset of the plurality of predefined machine-readable codes consists of predefined machine-readable codes that have not been defaced. The method also includes saving as user input values the user-selectable input values indicated by the indicia that are associated with the machine-readable codes in the set of predefined machine-readable codes that have not been read.

39 Claims, 8 Drawing Sheets

700

| Code | Machine Input Value | Status Field |
|---|---|---|
| 010111 | 1 | 1 |
| 010011 | 2 | 0 |
| 000110 | 3 | 1 |
| 110010 | 4 | 0 |
| 101011 | 5 | 1 |

702

710  720  730

| 010111 | 5 | 1 |

| Ticket Number | Date - Time Sold | Selected Input Values |
|---|---|---|
| 9315 | 6/27/02 - 10:33pm | 6, 8, 25, 20, 13, 5 |
| 1359 | 5/5/02 - 6.37pm | 7, 8, 22, 20, 31, 5 |
| 9513 | 12/20/02 - 5:15am | 5, 14, 1, 15, 3, 6 |

Figure 8b

| 9315 | 12/20/02 - 5:15am | 5, 14, 1, 15, 3, 6 |
|---|---|---|

METHOD AND DEVICE FOR DATA INPUT

PRIORITY CLAIM AND RELATED APPLICATIONS

This application claims priority from previously filed U.S. provisional patent applications 60/386,506 filed Jun. 5, 2002 and 60/435,434 filed Dec. 20, 2002. Both of these provisional applications are incorporated by reference in the present application in their entirety. A related U.S. utility application, Mobile Lottery Terminal Including Features Facilitating Use By Visually Impaired Ticket Agents, naming Christopher Collins et al as inventors, is being filed concurrently with the present application.

BACKGROUND INFORMATION

Human writeable machine-readable data input have many applications. Example applications include test taking, product orders form, data input for voter registration, draft registration, elections or other government functions, all-star sports balloting, etc.

Another example application for human writable machine-readable data input is the purchase of lottery tickets or selection of lottery numbers. Many forms of lottery gaming allow user selection of lottery numbers. Such forms of lottery gaming include instant win lotteries, pooled drawing lotteries and Keno type lotteries, and include such games as Pick 3, Pick 4, and Pick 6. Other forms of games may also require player selections that may be facilitated by human-writeable machine-readable data input, e.g., horse racing or other paramutual betting.

Lottery tickets may be sold at retail establishments such as liquor stores, convenience stores, grocery stores and gas stations. An attendant operating a lottery point of sale terminal may also be responsible for ordinary purchases. Counter space and attendant time may be at a premium time for retailers selling lottery tickets. Speeding purchase of lottery tickets may help reduce the lines that occasionally form when an extremely popular game takes place. Thus, it is desirable to reduce the complexity and time consumption involved in processing purchases of lottery tickets.

The attendant time required for a customer to purchase a lottery ticket may be reduced and accuracy increased using play slips, also referred to as pick slips or bet slips. A play slip is a card, ticket, or other printed media that indicates a customers lottery number selections, and that may be used by the customer to purchase a lottery ticket having the indicated customer lottery number selections. Pick slips may be provided separately from the lottery tickets and may be reused to purchase lottery tickets with the same number selections multiple times. Machine-readable codes, such as bar codes, have been utilized to increase the efficiency of data input methods, e.g., from a pick slip at a lottery point of sale terminal. U.S. Pat. No. 5,239,165 describes a bar code lottery ticket handling system such that a customer may jointly purchase a lottery ticket along with other items such as groceries. In this system, pick slips include a bar coded transaction number which may be communicated to a lottery device at a check stand. Other systems may include a customer-operated terminal that allows a customer to print a bar coded pick slip that may be tendered when a lottery ticket is purchased. The numbers picked by the customer may be encoded on the pick slip in an extended field bar code. The machine-readable codes speed the transaction of purchasing a lottery ticket, reducing the amount of attendant time required and the concomitant lines for popular games.

U.S. Published Patent Application No. 2001/0052083 describes presentation of a ticket with machine-readable indicia for authorization of user access to an application server in a wireless local area network. Machine-readable indicia are printed on a portable, physical ticket and the ticket is presented to an electro-optical reader for reading the indicia. This reusable card may thus save customer time as well as attendant time.

In some jurisdictions, lottery tickets are sold by individuals carrying portable terminals. In some of these jurisdictions the individuals selling the tickets may be visually impaired, e.g., in a lottery to benefit the blind. Large pick slip generators or readers are impractical for such applications. Accordingly, machine-readable pick slips that do not involve large and/or expensive equipment for creating and/or reading lottery pick slips are needed.

BRIEF DESCRIPTION OF THE DRAWINGS

FIG. 8a illustrates an example ticket sale log, according to an example embodiment of the present invention.

FIG. 8b illustrates an example entry from the example ticket sale log, according to an example embodiment of the present invention.

DETAILED DESCRIPTION OF EXAMPLE EMBODIMENTS

Example Media

Figure 1:
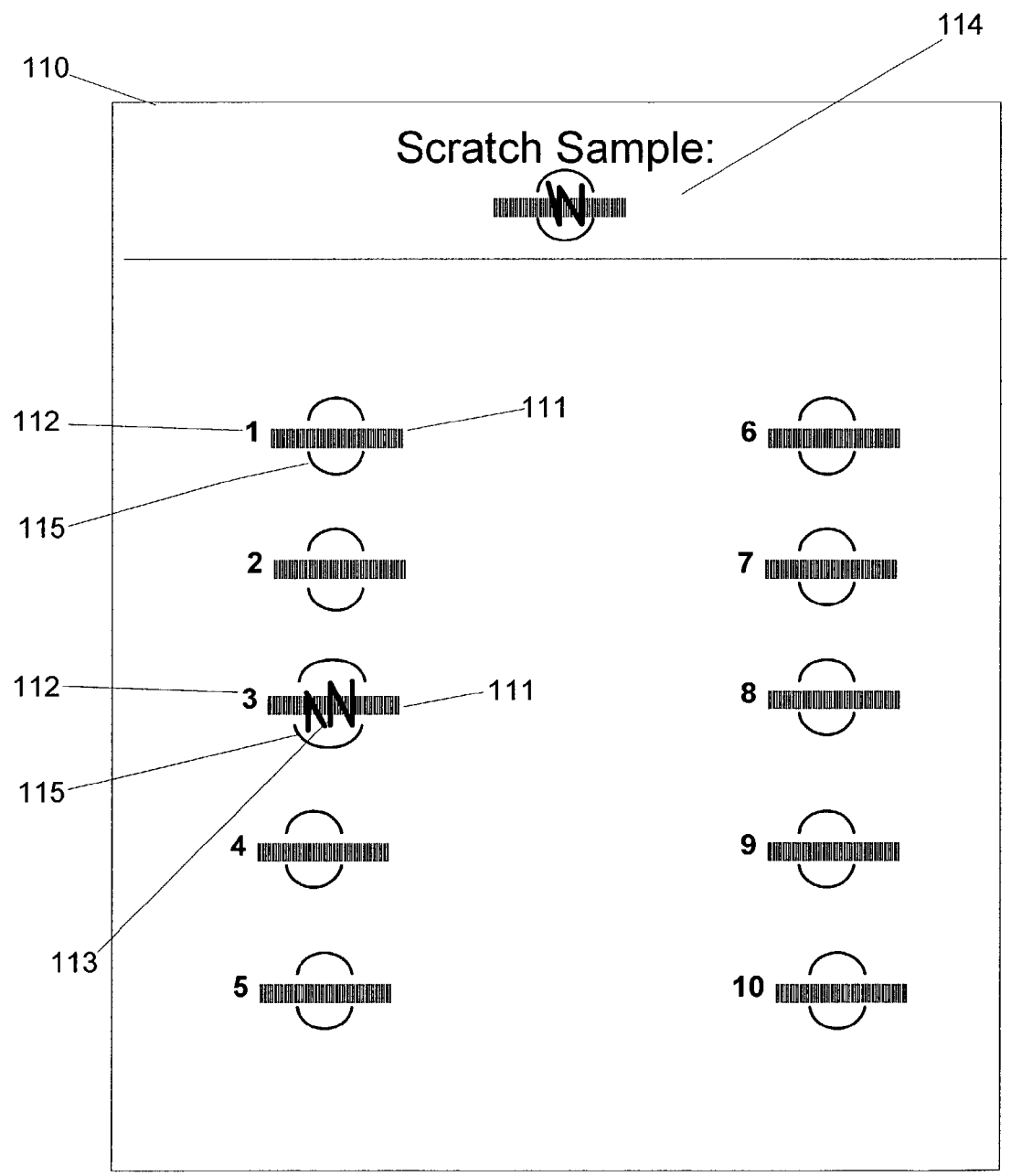
FIG. 1 illustrates an example printed media for data input, according to an example embodiment of the present invention.

FIG. 1 illustrates an example printed media for data input, according to an example embodiment of the present invention. The example printed media 110 is illustrated as a lottery play slip, although it will be appreciated that printed media embodying the present invention may be employed in other applications. The printed media may be paper, cardboard, plastic, or other material which allows human-readable information to be printed and from which machine-readable codes can be scanned. The example printed media may be 17 by 5.5 cm although other sizes may be provided. This dimension allows the printed media to be conveniently folded in half and kept in the credit card slot of a wallet. The difference between length and width facilities the recognition by a visually impaired attendant which axis is top-bottom and which is side-side, which may need to be recognized before using certain types of scanners. The printed media may also include raised indicia or printing which facilitates the recognition of the front of the printed media by a visually-impaired attendant.

The example lottery pick slip 110 may include a set of machine-readable codes 111. The machine-readable codes 111 may be bar codes. The bar code may be a linear bar code, e.g., a standard interleaved two of five bar code. No standard code dimension is necessary, but the ratio of bar to space may need to be maintained for different code dimension sizes, and the code dimensions can not be too small to be printed or so big that the focal length of a bar code reader used to read the printed media is inadequate to read the code.

Each machine-readable code 111 may be associated with a human-readable indicia 112 indicative of a user-selected value. For example, the indicia 112 may be numerals indicating lottery numbers that a customer may select. It will be appreciated that other types of indicia may be used to indicate user selections, e.g., names of candidates in an election, letters, pictorial symbols, etc. The indicia 112 may be printed adjacent to the associated machine-readable code 111. The indicia may correspond to lottery number picks that may be made by a player on a lottery pick slip, for a lottery ticket that the player wishes to purchase. The quantity of codes and indicia may depend on the quantity of numbers or other information which a user may select from. For example, an example lottery game may allow the user to select eleven numbers from the set of numbers 1–25.

It will be appreciated that the association between an indicia 112 and a machine-readable code 111 may also be indicated in other ways, e.g., by connecting the indicia 112 to the code 111 with a colored line that does not interfere with the bar code reading, or by printing each indicia and its associated code on a separate colored rectangle. It will further be appreciated that the machine-readable code need not represent the same numbers in the same format as the associated printed indicia, provided a format conversion, table look-up, and or other ways of mapping the machine-readable code to the user-selectable values are provided. For example, the scanned value from a bar code may be a binary code, which is format converted to an integer, and subsequently used to index an array that gives the associated user-selectable value.

A user marking area 115 may partially enclose at least a portion of the machine-readable code 111. The printed media may be configured so that a user may deface the code 111 by marking within the user marking area 115 to indicate a selection corresponding to the associated indicia, e.g., to pick the lottery number shown adjacent to the machine-readable code that is partially enclose by the user marking area that is defaced. The user may use a marking device such as a pen or pencil to deface the code 111. An example defaced code 113 is illustrated. A scanner for reading machine-readable codes is not capable of reading the defaced code 113. The type of defacement that may be required depends upon the type of machine-readable code employed. For example with a conventional bar code, at least some portion of the user mark may need to completely cover at least one of the white bands between two bars in the bar codes.

A conventional bar code may also be defaced if the width of one of the bars is changed along the entire length of the bar. The printed media 110 may include an instruction 114 indicating how a user should deface the codes 111 to select a value indicated by an associated indicia 112. It will be appreciated that now the defacement may need to be carried out may depend on the type of machine-readable code that is employed.

It will be appreciated that the example printed media for data input may be arranged in different ways, and may include additional information. For example, if the printed media is a lottery pick slip, it may also include additional instructions related to the lottery game, legal disclaimers, or advertising messages. Other applications for the example printed media may have appropriate printed information on the printed media.

It will be appreciated that if the printed media is of a size that will be conveniently folded, it may be important to position the machine-readable codes in a natural fold line, e.g., along the center line. This will avoid accidental damage or defacement when the printed media is folded. It will also be appreciate that better operation may be achieved if an adequate distance, e.g., 1.5 cm. is kept between the printed media edge and the machine-readable codes, minimizing the likelihood that a code will be obscured by a person's fingers when if the printed media is held in the hand while it is scanned.

Alternative Example Media

Figure 2:
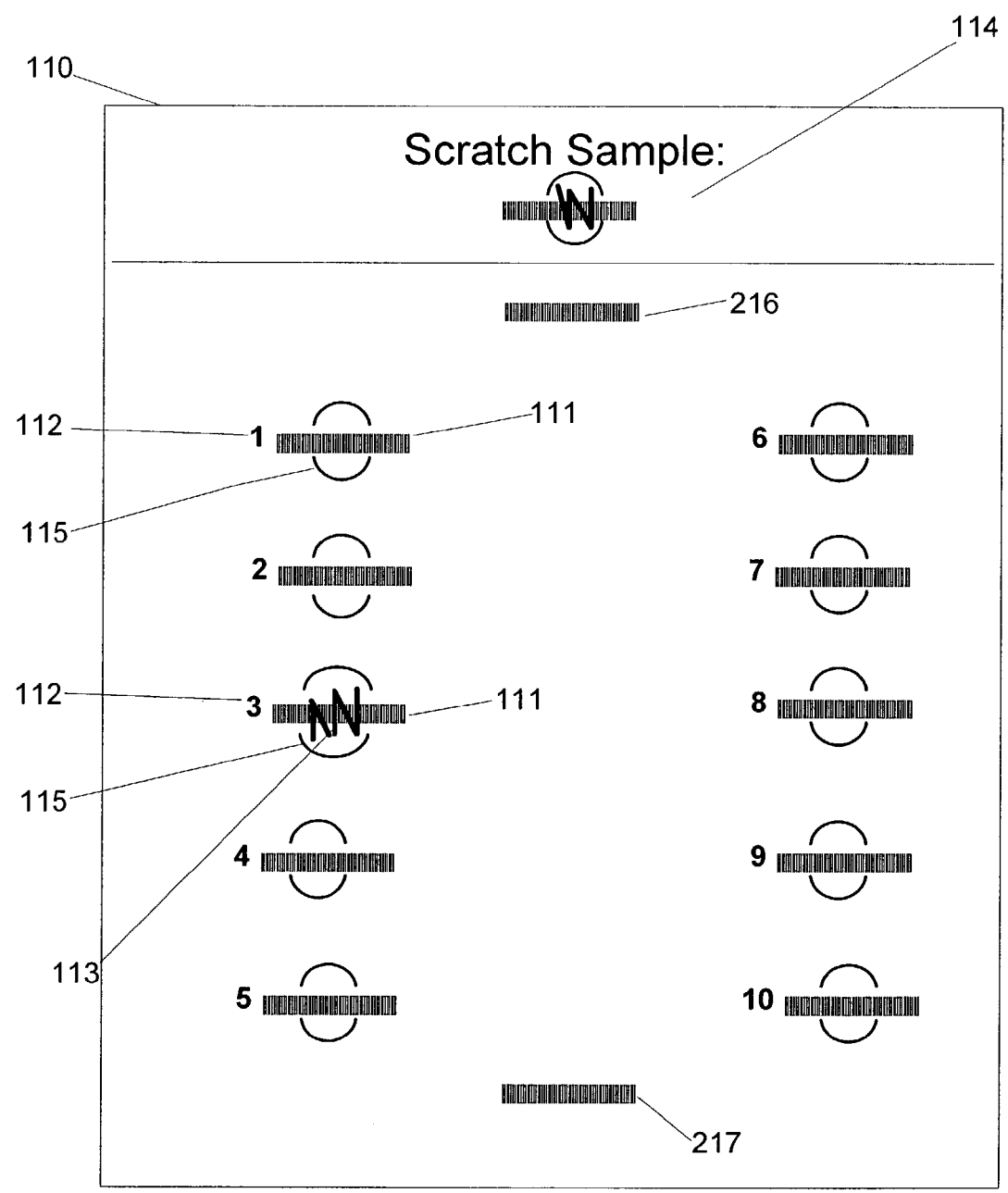
FIG. 2 illustrates an alternative example printed media for data input, according to an alternative example embodiment of the present invention.

FIG. 2 illustrates an alternative example printed media for data input, according to an alternative example embodiment of the present invention. The alternative example printed media 210 may be the same as the example printed media illustrated in FIG. 1, with the additions described as follows. A first check code 216 may be printed above the codes 111. A second check code 217 may be printed below the codes 111. Thus, when the printed media 110 is scanned from top to bottom using a conventional bar code reader, the first check code 216 may be scanned before the codes 111 are scanned. In the same situation, the second check code 217 may be scanned after all the codes 111 have been scanned. If both the first check code 216 and second check code 217 are not scanned, it may indicate that a complete scan of the printed media has not been made. It will be appreciated that other arrangements of checking codes, and other approaches to detecting whether or not the printed media has been completely scanned may also be provided.

It will be appreciated that other information may be included on an alternative example printed media. For example a machine-readable code may be included that indicates the type of printed media, e.g., the play slip for, and/or the number of machine-readable codes associated with user-selectable values that should be scanned from the printed media. For example a "type" code may indicate that the printed media is a 3 of 7 game, so that the user marks three codes, and four undefaced codes should be scanned from the printed media.

Example Procedure for Inputting Data

Figure 3:
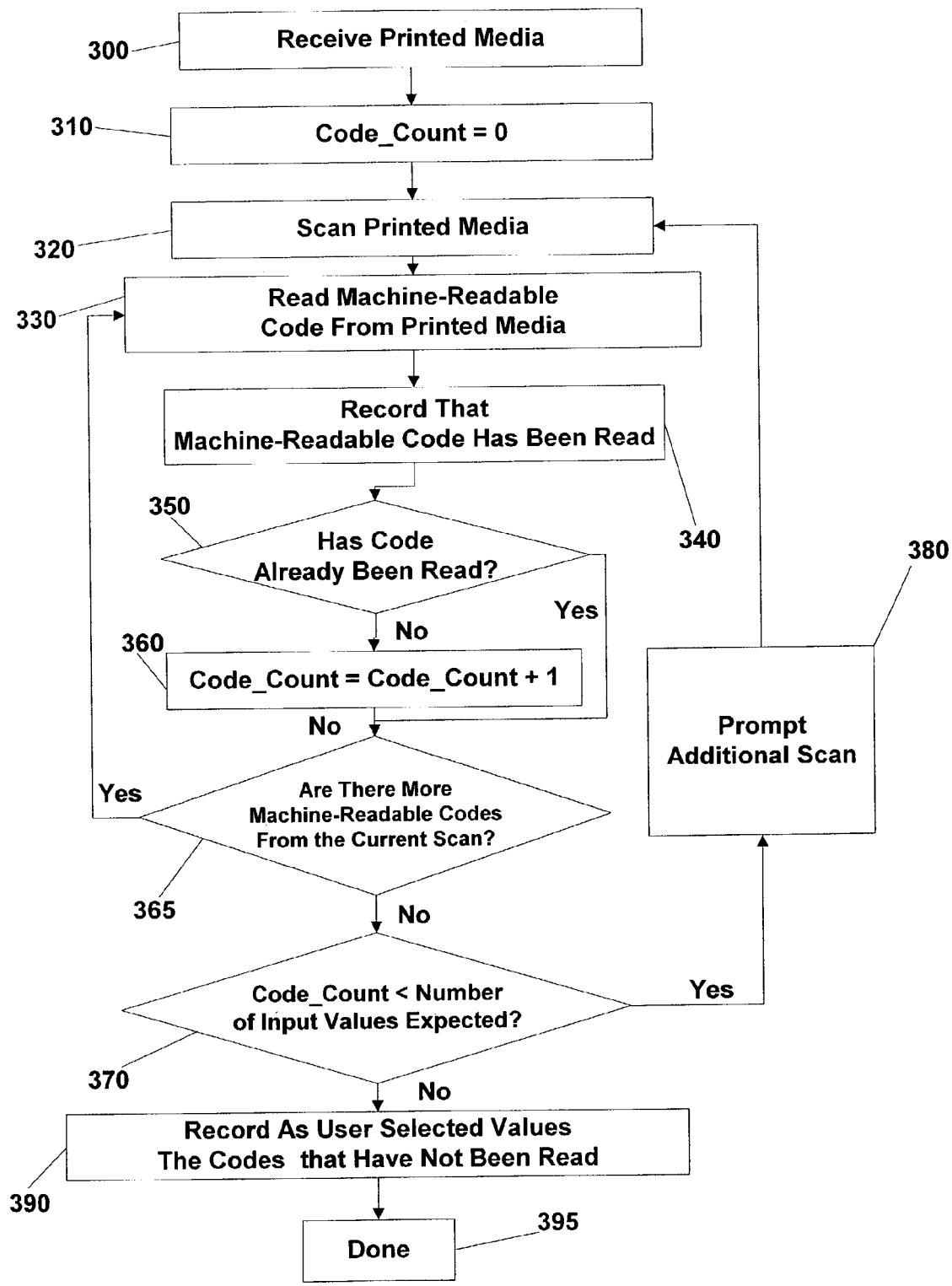
FIG. 3 illustrates an example procedure for data input, according to an example embodiment of the present invention.

FIG. 3 illustrates an example procedure for data input, according to an example embodiment of the present invention. The example procedure may be employed for reading lottery pick slips, or for other data input applications.

In 300, a printed media may be received, e.g., the lottery pick slip 110 illustrated in FIG. 1. The printed media may be received by an attendant who uses a manual scanner, by having the printed media received in a point of sale terminal or vending machine configured to accept and read printed media, etc. The received printed media may include machine-readable codes that are defaced as well as machine-readable codes that are unblemished. The machine-readable codes may be associated with user-selectable input values on the printed media. In the example data input procedure, the number of user-selectable input values that are to be input from a single printed media and the number of machine-readable codes on the printed media are both known prior to inputting the data. It will be appreciated that other approaches without this foreknowledge may be provided according to other embodiments of the present invention, e.g., the alternative example procedure described later. It will be appreciated that other approaches may also be provided, e.g., the printed media may include one or more codes indicating the type of media and/or the number of user-selectable inputs that are expected to be read from the printed media. This information may be derived from a machine-readable code on the printed media indicating the printed media type, e.g., what lottery game a lottery play slip is for. This information may also be received before or after the printed media is scanned, e.g., by key entry by an attendant who received the printed media.

In 310 a count may be initialized. The count may be provided to indicate the number of distinct machine-readable codes associated with user-selectable input values that have been scanned from the printed media received in 300. It will be appreciated that any other consistently used approach to tracking the number of such machine-readable codes read from the printed media may alternatively be employed.

In 320, the machine-readable codes on the printed media 110 may be scanned, e.g., using a conventional bar code scanner. In the example procedure, all the machine-readable codes on the printed media may be scanned in 320, and then read one at a time, e.g. from a buffer storing the codes that have been scanned. It will be appreciated that alternative approaches may be provided, e.g., scanning and reading and processing each code before scanning the next code.

In 330, one machine-readable code read in 320 from the scanning may be received, e.g., by reading the data from the scanner or scanner buffer with a processor controlling the example procedure. The machine-readable code may be format converted or otherwise processed, e.g., to indicate which of the allowed user-selectable values the machine-readable code is associated with. It will be appreciated that other processing may also be performed, e.g., other forms of validation and error checking on the machine-readable code.

In 340, a record of the machine-readable code may be made. For example, an entry in a table of user-selectable values may be marked to indicate that the particular user-selectable value associated with the machine-readable code has been read from the printed media, which may indicate that the user-selectable value was not selected by the person filling out the printed media. It will be appreciated that other approaches to keeping track of the machine-readable codes that have been read may also be provided.

In 350, if the machine-readable code has not been previously read, the example procedure continues with 360. If the machine-readable code has been previously read 360 may be skipped and the example procedure may continue with step 365.

In 360, the count of distinct machine-readable codes that are associated with user-selectable values and that have been read from the printed media may be incremented.

In 365, if other machine-readable codes have been read in the scan performed in 320, the example procedure may continue with 330. If there are no remaining machine-readable codes from the current scan, the example data input procedure may continue with 370.

In 370, whether all of the machine-readable codes associated with user-selected values have been read from the printed media received in 300 may be tested. In the example procedure, this test may be performed using the count described above, because the number of user-selected values is known. If the count is less than the number of codes which is expected, the example procedure may continue with 380, otherwise, the example procedure may continue with 390.

In 380, a prompt or other signal may be given to indicate another scan is required. For example, a beep or distinctive tone may be sounded. The example procedure may then resume with 320, when another scan of the printed media is made.

In 390, the actual user-selected values may be determined. The user-selected values may be the values associated with the machine-readable codes on the printed media that have not been scanned in the example procedure for inputting data, e.g., the values whose indicia are associated with machine-readable codes that have been defaced and are therefore unreadable. The user-selected values may be recorded by transmitting them via a network connection to another application or system, by recording them in a database that saves user selections, and/or by outputting them with the printer or another output device.

It will be appreciated that other steps may be added and the existing steps may be re-ordered in the example procedure, e.g., additional data validation steps may be added.

Alternative Example Procedure For Inputting Data

Figure 4:
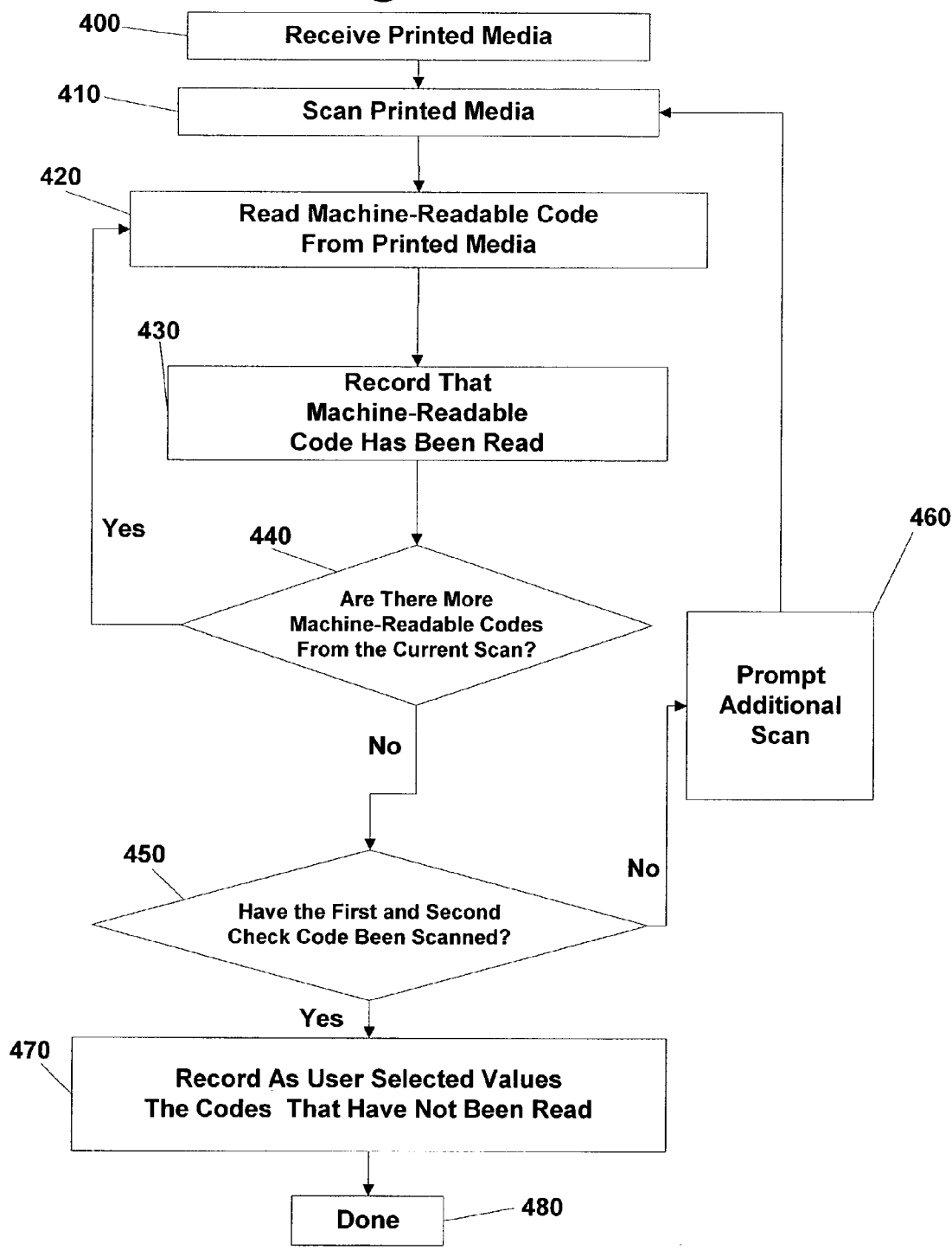
FIG. 4 illustrates an alternative example procedure for data input, according to an example embodiment of the present invention.

FIG. 4 illustrates an alternative example procedure for data input, according to an example embodiment of the present invention. The example procedure may be employed for reading lottery pick slips, or for other data input applications.

In 400, a printed media may be received, e.g., the lottery pick slip 210 illustrated in FIG. 2. The received printed media may include machine-readable codes that are defaced as well as machine-readable codes that are unblemished. The machine-readable codes may be associated with user-selectable inputs on the printed media. In the example data input procedure, the universe of possible user-selectable input values that may be input may be known prior to inputting the data. Unlike the example procedure illustrated in FIG. 3, the number of user-selected inputs need not be predetermined. However, in the alternative procedure, machine-readable check codes may need to be included on the printed media. The check codes may be used to help determine whether the printed media has been completely scanned.

In 410, the machine-readable codes on the printed media 110 may be scanned, e.g., using a conventional bar code scanner.

In 420, one machine-readable code read in 410 from the scanning may be read, e.g., by receiving data from a scanner or scanner buffer with a processor controlling the example procedure. The machine-readable code may be format converted or otherwise processed, e.g., to indicate which of the allowed user-selectable values the machine-readable code is associated with to convert a binary code to some other format, etc. It will be appreciated that other processing may also be performed, e.g., other forms of validation and error checking on the machine-readable code.

In 430, a record of the machine-readable code may be made. For example, an entry in a table of user-selectable values may be marked to indicate that the machine-readable code associated with a particular user-selectable value has been read, which may indicate that the code has not been defaced and therefore has not been selected by the user of the printed media. It will be appreciated that other approaches to keeping track of the machine-readable codes that have been read may also be provided.

In 440, if other machine-readable codes have been read in the scan performed in 410, the example procedure may continue with 420. If there are no remaining machine-readable codes from the current scan, the example data input procedure may continue with 450.

In 450, whether any check codes present on the received printed media have been read may be determined. For example, whether the first check code 216 and the second check code 217 have been read from the printed media received in 400 may be tested. The failure to receive the check codes may indicate the printed media has not been properly scanned. If the check codes have not been read, the example procedure may continue with 460, otherwise, the example procedure may continue with 470.

In 460, a prompt or other signal may be given to indicate another scan is required. The example procedure may then resume with 410, when another scan of the printed media is made.

In 470, the user-selected values may be recorded. The user-selected values are the values associated with the machine-readable codes on the printed media that have not been scanned in the example procedure for inputting data, e.g., the values whose indicia are associated with machine-readable codes that have been defaced and are therefore unreadable. The user-selected values may be recorded by transmitting them via a network connection to another application or system, by recording them in a database that saves user selections, and/or by outputting them with the printer or another output device.

Example Procedure For Obtaining A Lottery Ticket

Figure 5:
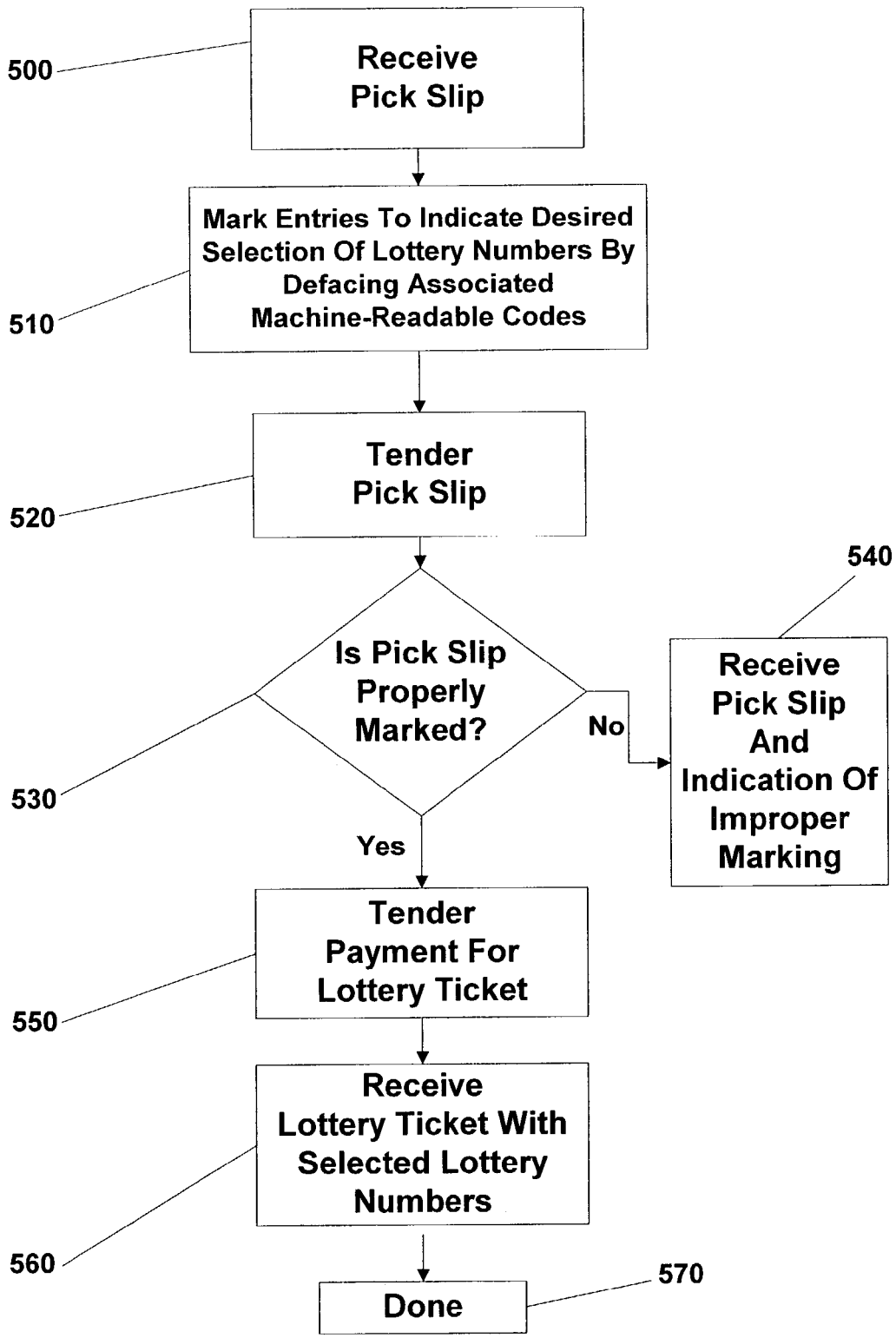
FIG. 5 illustrates an example procedure for obtaining a lottery ticket, according to an example embodiment of the present invention.

FIG. 5 illustrates an example procedure for obtaining a lottery ticket, according to an example embodiment of the present invention.

In 500, a pick slip for the selection of lottery numbers may be received, e.g., the example printed media 110, described above, may be handed to a customer by an attendant or dispensed from a machine.

In 510, desired lottery numbers may be selected, e.g., by a lottery customer, by defacing machine-readable codes on the pick slip. The machine-readable codes which are defaced are associated with the desired lottery numbers. For example, the numbers that may be selected may be printed adjacent to the machine-readable codes, which are partially surrounded with a user marking area. The codes may be defaced by marking with a pen or pencil, either creating lines in the user marking area, by completely coloring in the user marking area, etc.

In 520, the pick slip may be tendered, e.g., to a lottery sales attendant. It will be appreciated that the pick slip may also be tendered in other ways, e.g., by inserting it in a lottery ticket vending machine.

In 530, the pick slip may be scanned and validated. If the pick slip is not valid, the example purchase procedure may continue with 540. Otherwise, the example lottery ticket purchase procedure may continue with 550.

In 540, the pick slip may be returned. Instructions or other indications may be provided indicating why the pick slip is invalid, e.g., if too many or too few numbers were selected. Depending on the situation the card may be corrected and resubmitted, as illustrated by the dotted line.

In 550, the purchase price for the lottery ticket may be tendered. Various tender methods may be provided, e.g., cash, debit or credit card, smart card, pre-purchased redeemable chits, etc.

In 560, a lottery ticket containing the lottery numbers selected on the pick slip may be received, e.g., by the lottery customer.

It will be appreciated that other steps may be included in the example procedure for purchasing a lottery ticket. For example additional validation or payment steps may be included. For example, the sold lottery ticket may be recorded in a log and/or in a central lottery database. It will also be appreciated that the order of the step of the example procedure may be changed, e.g., payment may be tendered at the beginning of the procedure, etc.

Example Data Input System

Figure 6:
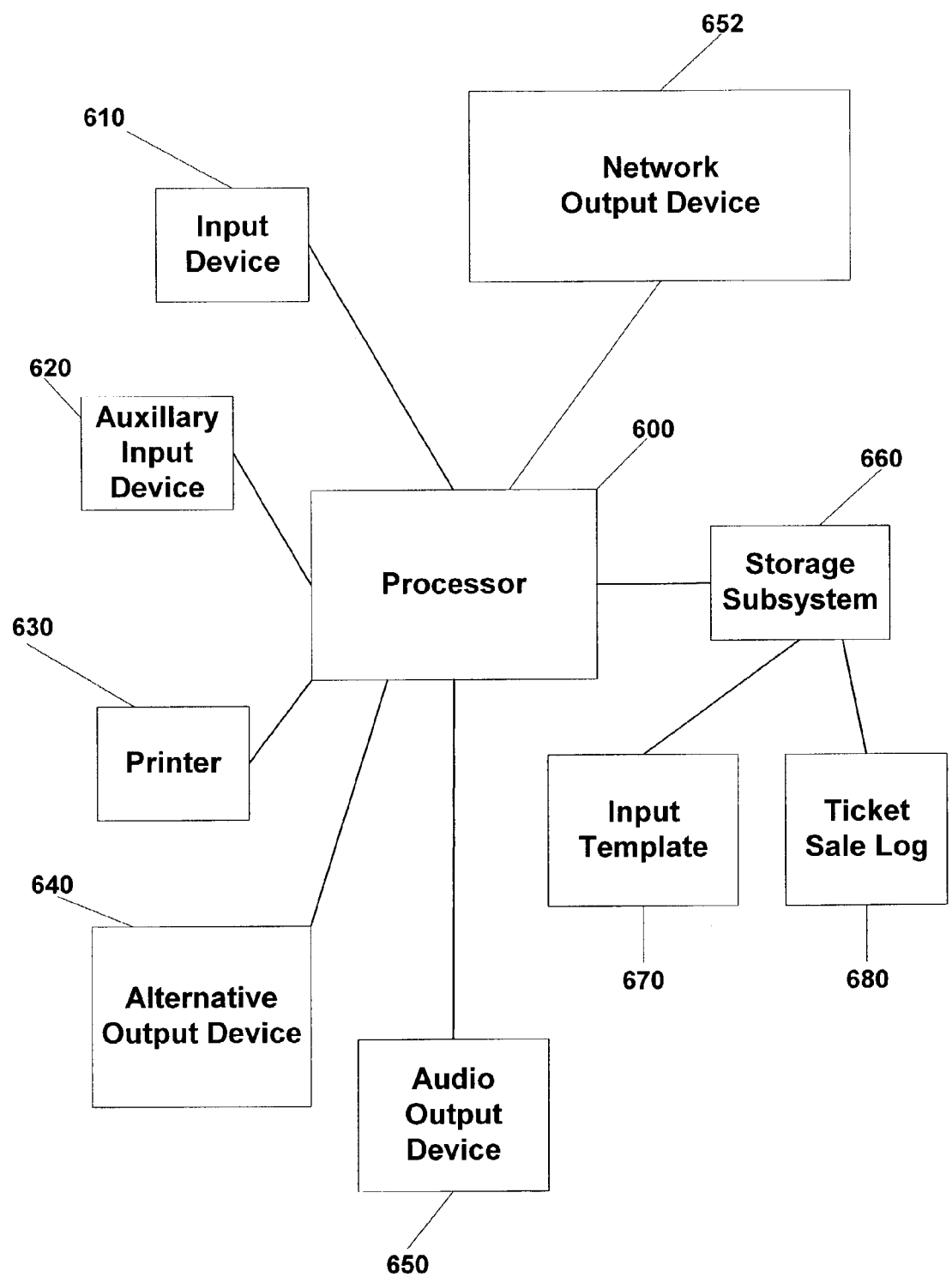
FIG. 6 illustrates an example data input system, according to an example embodiment of the present invention.

FIG. 6 illustrates an example data input system, according to an example embodiment of the present invention. The data input system may be provided as a custom-programmed version of a standard programmable bar code scanning device or may be provided as a custom hardware device. The example data system may be a single physical unit, or may include multiple subunits connected by networks or other communication devices. The example data input system may be provided as part of a portable lottery ticket sales terminal.

The example data input system may include a processor 600. The processor may be configured to control the operation of the data input system, to process received inputs, generate outputs, and control the other components of the example data input system. The processor may be provided as a microprocessor, a single board computer, or other combination of hardware, firmware, and software components.

The processor may contain, or have access to, software implementing the example procedures for inputting data described previously. A disk, memory, CD-ROM, flash memory, or other media may contain a sequence of instructions which may be executed to control the example procedures described above.

The example data input system may include an input device 610. The input device may be a conventional bar code scanner or other device configured to read machine-readable input codes from a printed media. The processor may be in communication with an input device 610, e.g., by a direct wired connection, over a bus, or over a network. Particularly for a wand type scanner, a secure wireless LAN connection may be particularly suitable. The machine-readable codes read from the printed media may be transmitted to the processor 600 by the input device 610.

The example data input system may also include an auxiliary input device 620. The auxiliary input device may be a keyboard, keypad, or other device that allows inputs such as alphanumeric values, to be received by the device from an operator or attendant. The auxiliary input device 620 may be in communication with the processor 610, e.g., connected by a bus or network. It will be appreciated that, in a lottery for the visually impaired application, the auxiliary input device may be a braille keyboard.

The example data input system may also include a printer 630. The processor 600 may be in communication with the printer 630, e.g., over a bus or network. The printer 630 may be configured to print a lottery ticket and/or receipt which contains user selected lottery numbers that were determined by scanning the example printed media 110 and determining which user-selectable input values did not have associated machine-readable codes scanned.

The example data input system may also include an alternative output device 640. An alternative output device 640 may be in communication with the processor 600, e.g., over a bus or network. The alternative output device 640 may be configured to output printed media with Braille print. Particularly for a blind operator or attendant, the system may be configured to print copies of any audits or records on the alternative output device. Additional alternative output devices 640 may also be provided, e.g., a LCD display that visually outputs information such as instructions and confirmation that a ticket has been generated.

The example data input system may also include an audio output device 650. The processor 600 may be in communication with the audio output device 650, which may acoustically output information. The audio output device 650 may be configured to output a sound that indicates that the required number of machine-readable codes have not been scanned, possibly with different output sounds for too many or two few machine-readable codes. Other output sounds may also be provided for other purposes, e.g., to confirm the acceptance of a lottery ticket number, to confirm payment, to indicate the input device is ready to receive input, etc. If the alternative printed media is used, the audio output device 650 may output an error indication when at least one of the first check code 216 and second check code 217 has not been scanned.

The example data input system may also include a network output device 652. The network output device 652 may be in communication with the processor 600. The network output device 652 may provide an interface between the example data input and a network, a private wide area network, a phone line connection, the internet, etc. The network output device 652 may be configured to transmit information from the data input system and to receive information for outside the system, e.g., from a central lottery control server. The information the network output device 652 is configured to transmit may include the user selected values that are obtained by reading the example printed media, e.g., a lottery pick slip.

The example data input system may also include a storage subsystem 660. The storage subsystem may include RAM, ROM, magnetic disks, flash memory, optical memory, or other forms of hardware storage. The storage subsystem 660 may also including various forms of storage software, e.g., a relational database, object-oriented data structures, etc. The processor 600 may be in communication with the storage subsystem 660, e.g., over a bus or network. The storage subsystem 660 may also be contained in the processor.

The example data input system may also include an input template 670. The example data input template 670 may be included as part of the storage subsystem 660 or may be separate. The input template 670 may contain information indicative of the machine-readable codes that are present on printed media that the example data input system is configured to read. The input template 670 may be accessible to the processor 600, for both reading and writing. It will be appreciated that multiple input templates may be provided, e.g., for multiple formats of printed media such as different lottery games having different types or quantities of user-selectable lottery numbers.

The example data input system may also include a ticket sale log 680. The ticket sale log 680 may be contained as part of the storage subsystem 660 or may be separate. The ticket sale log 680 may contain information indicative of lottery tickets that have been sold using the example data input system, e.g., tickets with lottery numbers that have been presented on pick slips that the example data input system is configured to read. The log 680 may be accessible to the processor 600. Separate logs may be provided for multiple game types, or the log may include fields which indicate the game type of each ticket in the log.

Example Input Template

Figures 7A, 7B:
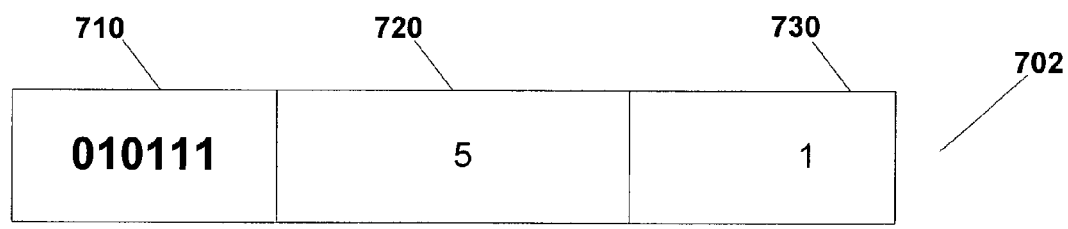
FIG. 7a illustrates an example input template, according to an example embodiment of the present invention.
FIG. 7b illustrates an example entry from the example input template, according to an example embodiment of the present invention.

FIG. 7a illustrates an example input template, according to an example embodiment of the present invention. The input template 700 may include an entry 702 for each of the machine-readable codes 710 that may be on the printed media 110 that are associated with user-selectable input values. It will be appreciated that, although the example input template is illustrated as a table, any conventional data structure may be employed, e.g., a relational database, a linked list, etc.

FIG. 7b illustrates an example entry from an example input template, according to an example embodiment of the present invention. The example entry 702 may include several fields, each containing information related to one of the machine-readable codes found on the printed media described previously. The entry 702 may include the machine-readable input value 710. The machine input value 720 is a representation of the machine-readable code 710 that is found on the printed media. The machine input value 710 may be in different formats, depending on how the input device operates, e.g., it may be stored as a single number, a sequence of numbers, in binary, hexadecimal, or other format that matches the value returned by the input device. It will be appreciated that values that do not match the format of the values of the input device may be used, provided this is considered in the design of the example input device, and a suitable conversion capability is provided to allow comparison of the read values with the stored values in the input template.

The entry 702 may also contain a user-selectable input value 720. The user-selectable input value 720 is the value that may be associated with the machine-readable input code found in the same entry, and which may be printed adjacent or otherwise associated with the corresponding machine-readable input code on the printed media.

The input template entry 702 may also include a status field 730, which may be configured to indicate whether or not a machine-readable code 710 has been scanned from the printed media presently being read. Any conventional representation for the status may be used, e.g., a simple binary digit with a predetermined meaning, a "Y" or "N" symbol, a count of the number of times the code has been read (so that "0" would indicate it had not been read at all), etc.

It will be appreciated that other information may be included in the example input template, and that the data structure of the example input template may be varied. For example, the input template may be part of a larger, more complex data structure containing information for many different kinds of printed media, e.g., a different type of pick slip for each of several different lottery games.

Example Ticket Sale Log

FIG. 8a illustrates an example ticket sale log, according to an example embodiment of the present invention. The ticket sale log 800 may be configured to store information regarding to ticket sales. Each ticket that has been sold using the example data input device may have a corresponding entry 802 in the example ticket sale log 800. It will be appreciated that, although the example ticket sale log is illustrated as a table, any conventional data structure may be employed that facilitates that recording of information on ticket sales, e.g., a linked list, a relational database, etc.

FIG. 8b illustrates an example entry 802 from the example ticket sale log, according to an example embodiment of the present invention. The entry 802 may correspond to an individual lottery ticket sold using the example data input device. The entry 802 may include several fields giving information about the lottery ticket. The number of the ticket sold may be recorded using a ticket number 810. The date and time 820 of the ticket sale may be also recorded. The ticket entry may also include the selected input values 830 of the ticket.

It will be appreciated that the ticket sales log may include other fields and may be provided using a range of different data structures besides a table, e.g., a multi-dimensional array, a linked list, a relational database, etc. Other fields that may be included may include the type of game, the value of the ticket, whether the ticket has been redeemed, the identity of the ticket seller, etc. The ticket sales log may be stored entirely on a mobile data input device, may be stored entirely on a central lottery control computer, or may be stored in some other way, e.g., partial logs stored on a mobile data input device, with periodic uploads or synchronization with a central lottery computer.

MODIFICATIONS

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

What is claimed is:

1. A method of inputting data, comprising:
   marking with a writing instrument a printed media to indicate selected user input values, the printed media including thereon
      a plurality of predefined machine-readable codes, and
      a plurality of human-readable indicia each indicating a respective user-selectable input value and associated with a respective one of the plurality of predefined machine-readable codes, the marking defacing a first subset of the machine-readable codes, the first subset of the machine-readable codes associated with the selected user input values;
   reading a second subset of the plurality of predefined machine-readable codes from the printed media that have not been defaced by the marking; and
   writing as the selected user input values the user-selectable input values associated with the first subset of the machine-readable codes.

2. The method of inputting data of claim 1, further comprising:
   attempting to read the machine-readable codes from the printed media;
   when attempting to read the machine-readable codes from the printed media, failing to read the predefined machine-readable codes in the first subset of the machine-readable codes associated with the selected user input values.

3. The method of inputting data of claim 1, wherein writing as selected user input values includes printing the selected user input values on a lottery ticket.

4. The method of inputting data of claim 1, wherein writing as selected user input values includes saving the selected user input values in a lottery ticket sales log.

5. The method of inputting data of claim 1, wherein writing as selected user input values includes transmitting the selected user input values to a lottery database server.

6. The method of inputting data of claim 5, comprising:
   determining the predetermined expected quantity of user input values as a function of a machine-readable control code on the printed media.

7. The method of claim 6, further comprising:
   scanning the printed media with a bar code reader.

8. The method inputting data of claim 1, wherein the printed media is a lottery pick slip.

9. The method of inputting data of claim 8 further comprising:
   determining the predetermined expected quantity of user input values as a function of a machine-readable control code on the printed media.

10. The method of inputting data of claim 1, wherein a first human-readable indicia of the plurality of human-readable indicia is associated with a first predefined machine-readable code of the plurality of machine-readable codes by being placed adjacent to the first machine-readable code on the printed media.

11. The method of claim 1, further comprising:
    producing an indication that further scanning of the printed media is required if a quantity of distinct machine-readable codes that has been read from the printed media is less than the difference between a predetermined expected quantity of selected user input values and a total quantity of user-selectable input values.

12. The method of claim 1, further comprising:
    producing an error indication if a quantity of distinct machine-readable codes that has been read from the printed media is greater than the difference between a predetermined expected quantity of selected user input values and a total quantity of user-selectable input values.

13. The method of claim 12, further comprising:
    re-scanning the printed media with the bar code reader, wherein the written selected user input values are only user input values whose associated machine-readable codes have not been read in both the scanning and the re-scanning.

14. The method of claim 1, further comprising:
    producing an error indication if a machine-readable check code has not been read.

15. The method of claim 14, wherein the machine-readable check code is not associated with a human-readable indicia.

16. The method of claim 1, further comprising:
    updating an entry in an input record data structure to indicate that a first machine-readable code associated with a first user-selectable input value has been read.

17. The method of claim 1, wherein the plurality of predefined machine-readable codes are bar codes.

18. The method of claim 1, wherein the writing instrument is one of a pen or pencil.

19. A method of generating a lottery ticket, comprising:
    receiving a pick slip including a first bar code defaced by marking with a writing instrument, a first human-readable indicia representing a first user-selectable lottery number and associated with the first bar code, and a first marking area containing at least a portion of the first bar code;
    scanning the play slip with a bar code scanner;
    failing to read the first bar code in the scanning; and
    printing a lottery ticket containing the first user-selectable lottery number.

20. The method of claim 19, further comprising:
    if a second bar code associated with a second human-readable indicia representing a second user-selectable lottery number is read from the play-slip when the play-slip is scanned, printing a lottery ticket not containing the second user-selectable lottery number.

21. The method of claim 19, wherein the writing instrument is a pen or pencil.

22. The method of claim 19, wherein
the pick slip includes a second bar code which is unmarked, a second human readable indicia representing a second user-selectable lottery number and associated with the second bar code, and a second marking area containing at least a portion of the second bar code,
and wherein the method further comprises
reading the second bar code in the scanning;
and wherein the lottery ticket does not contain the second user-selectable lottery number.

23. A method of generating a lottery ticket, comprising:
receiving a pick slip including a plurality of bar codes, a first subset of the plurality of bar codes having been defaced by marking with a writing instrument, a second subset of the plurality of bar codes being unmarked, a plurality of human-readable indicia each associated with a respective one of the plurality of bar codes and each representing a respective user-selectable lottery number, and a plurality of player marking areas each associated with a respective one of the plurality of bar codes;
scanning the play slip with a bar code reader without reading the first subset of the plurality of bar codes; and
printing a lottery ticket containing a subset of the plurality of user-selectable lottery numbers, each user-selectable lottery number in the subset of the plurality of user-selectable lottery numbers being associated with a bar code in the first subset of the plurality of bar codes that has not been read when the play slip was scanned.

24. The method of claim 23, wherein
the lottery ticket contains no user-selectable lottery numbers whose associated bar codes were read when the play slip was scanned.

25. The method of claim 23, wherein
the marking areas are located so that when a player marks one of the marking areas the respectively associated bar code will be rendered unscannable.

26. The method of claim 23, wherein the writing instrument is a pen or pencil.

27. The method of claim 23, wherein the scanning fails to read any of the bar codes in the first subset of the plurality of bar codes.

28. The method of claim 27, wherein the scanning reads all the bar codes in the second subset of the plurality of bar codes.

29. An article of manufacture comprising a computer-readable medium having stored thereon instructions adapted to be executed by a processor, the instructions which, when executed, define a series of steps to be used to control a method for inputting data, said steps comprising:
marking with a writing instrument a printed media to indicate selected user input values, the printed media including thereon
a plurality of predefined machine-readable codes, and
a plurality of human-readable indicia each indicating a respective user-selectable input value and associated with a respective one of the plurality of predefined machine-readable codes, the marking defacing a first subset of the machine-readable codes, the first subset of the machine-readable codes associated with the selected user input values;
reading a second subset of the plurality of predefined machine-readable codes from the printed media that have not been defaced by the marking; and
writing as the selected user input values the user-selectable input values associated with the first subset of the machine-readable codes.

30. A data input device, comprising:
a scanner;
a processor in communication with the scanner;
a set of predetermined input values each associated with a machine readable code configured to be marked with a writing instrument by a user to reflect a user selection of a respective one of the set of predetermined input values, the set of predetermined input values accessible to the processor; and
an output device in communication with the processor, the output device configured to communicate a user selected value when an input media is scanned with the scanner and a machine-readable code associated with the user selected value in the set of predetermined input values is not read by the scanner because said machine-readable code associated with the user selected value has been defaced with a writing instrument by the user to indicate a user selection.

31. The data input device of claim 30, further comprising,
a set of game identifiers, each game identifiers associating a type of game with a quantity of machine-readable codes associated with a quantity of predetermined input values that are expected to be read from the input media.

32. The data input device of claim 30, wherein:
the output device is a computer-readable medium.

33. The data input device of claim 30, wherein
the output device is a network connection to a central server.

34. The data input device of claim 30, wherein
the output device is a printer.

35. The data input device of claim 30, wherein
the input media is a lottery pick slip and the output device is configured to print a lottery ticket containing the user-selected value as a lottery number.

36. An article of manufacture comprising a computer-readable medium having stored thereon instructions adapted to be executed by a processor, the instructions which, when executed, define a series of steps to be used to control a method of generating a lottery ticket, said steps comprising:
receiving a pick slip including a first bar code defaced by marking with a writing instrument, a first human-readable indicia representing a first user-selectable lottery number and associated with the first bar code, and a first marking area containing at least a portion of the first bar code;
scanning the play slip with a bar code scanner;
failing to read the first bar code in the scanning; and
printing a lottery ticket containing the first user-selectable lottery number.

37. The article of claim 27, wherein the method further comprises:
if a second bar code associated with a second human-readable indicia representing a second user-selectable lottery number is read from the play-slip when the play-slip is scanned, printing a lottery ticket not containing the second user-selectable lottery number.

38. An article of manufacture comprising a computer-readable medium having stored thereon instructions adapted to be executed by a processor, the instructions which, when executed, define a series of steps to be used to control a method of generating a lottery ticket, said steps comprising:
receiving a pick slip including a plurality of bar codes, a first subset of the plurality of bar codes having been defaced by marking with a writing instrument, a second subset of the plurality of bar codes being unmarked, a plurality of human-readable indicia each associated with a respective one of the plurality of bar codes and each representing a respective user-selectable lottery number, and a plurality of player marking areas each associated with a respective one of the plurality of bar codes;

scanning the play slip with a bar code reader without reading the first subset of the plurality of bar codes; and printing a lottery ticket containing a subset of the plurality of user-selectable lottery numbers, each user-selectable lottery number in the subset of the plurality of user-selectable lottery numbers being associated with a bar code in the first subset of the plurality of bar codes that has not been read when the play slip was scanned.

39. The article of claim 38, wherein:

the lottery ticket contains no user-selectable lottery numbers whose associated bar codes were read when the play slip was scanned.

* * * * *